(12) United States Patent
Bapat

(10) Patent No.: US 6,175,166 B1
(45) Date of Patent: Jan. 16, 2001

(54) SYSTEM FOR MITIGATING VOLTAGE DISTURBANCES AND INTERRUPTIONS FOR POWER DISTRIBUTION APPLICATIONS

(75) Inventor: Vinod N. Bapat, Raleigh, NC (US)

(73) Assignee: ABB Power T&D Company Inc., Raleigh, NC (US)

( * ) Notice: Under 35 U.S.C. 154(b), the term of this patent shall be extended for 0 days.

(21) Appl. No.: 09/332,718

(22) Filed: Jun. 14, 1999

(51) Int. Cl.$^7$ .................................................. H02J 9/00
(52) U.S. Cl. ...................................... 307/64; 363/34
(58) Field of Search ............................. 307/64, 66, 67, 307/80, 81, 85, 86, 87; 216/121; 363/34

(56) References Cited

U.S. PATENT DOCUMENTS

| | | |
|---|---|---|
| 3,614,461 | 10/1971 | Speer .................................... 307/64 |
| 4,010,381 * | 3/1977 | Fickenscher et al. ................. 307/66 |
| 4,291,366 | 9/1981 | Nelson ................................... 363/17 |
| 4,426,587 | 1/1984 | Nouet .................................... 307/66 |
| 4,639,848 | 1/1987 | Sakai .................................... 363/51 |
| 4,673,826 | 6/1987 | Masson ................................. 307/66 |
| 4,783,728 | 11/1988 | Hoffman ............................... 363/37 |
| 4,894,764 | 1/1990 | Meyer et al. ......................... 363/65 |
| 5,010,469 | 4/1991 | Bobry .................................... 363/37 |
| 5,160,851 | 11/1992 | McAndres ............................. 307/66 |
| 5,184,025 | 2/1993 | McCurry et al. ...................... 307/66 |
| 5,229,650 | 7/1993 | Kita et al. ............................. 307/66 |
| 5,483,108 | 1/1996 | Girard et al. ......................... 307/64 |
| 5,610,805 | 3/1997 | Gupta .................................... 363/37 |
| 5,619,077 * | 4/1997 | Green et al. .......................... 307/64 |
| 5,633,789 | 5/1997 | Kimura et al. ........................ 363/50 |
| 5,646,458 | 7/1997 | Bowyer et al. ....................... 307/67 |
| 5,694,312 | 12/1997 | Brand et al. ......................... 363/144 |
| 5,767,591 | 6/1998 | Pinkerton ............................. 307/64 |
| 5,771,161 | 6/1998 | Jackson et al. ...................... 363/40 |
| 5,781,422 | 7/1998 | Lavin et al. .......................... 363/37 |
| 5,889,659 * | 3/1999 | Emmerich ............................. 363/34 |
| 5,929,410 * | 7/1999 | Mum .................................... 218/121 |

* cited by examiner

Primary Examiner—Josie Ballato
Assistant Examiner—Robert L. Deberadinis
(74) Attorney, Agent, or Firm—Woodcock Washburn Kurtz Mackiewicz & Norris LLP

(57) ABSTRACT

A low cost voltage disturbance mitigation system is capable of providing continuous power to a load despite short interruptions or sag disturbances of the utility power. The interruption and sag mitigation system makes use of a combination of unique thermal and electrical properties of magnetic components, power semiconductor devices, and high-discharge-rate energy storage devices. It also facilitates a modular solution that can be easily and economically scaled up or down for use over a wide range of voltage and power levels, e.g., 480 V to 36 kV and 500 kVA to 10,000 kVA.

15 Claims, 3 Drawing Sheets

…

Figure 1:
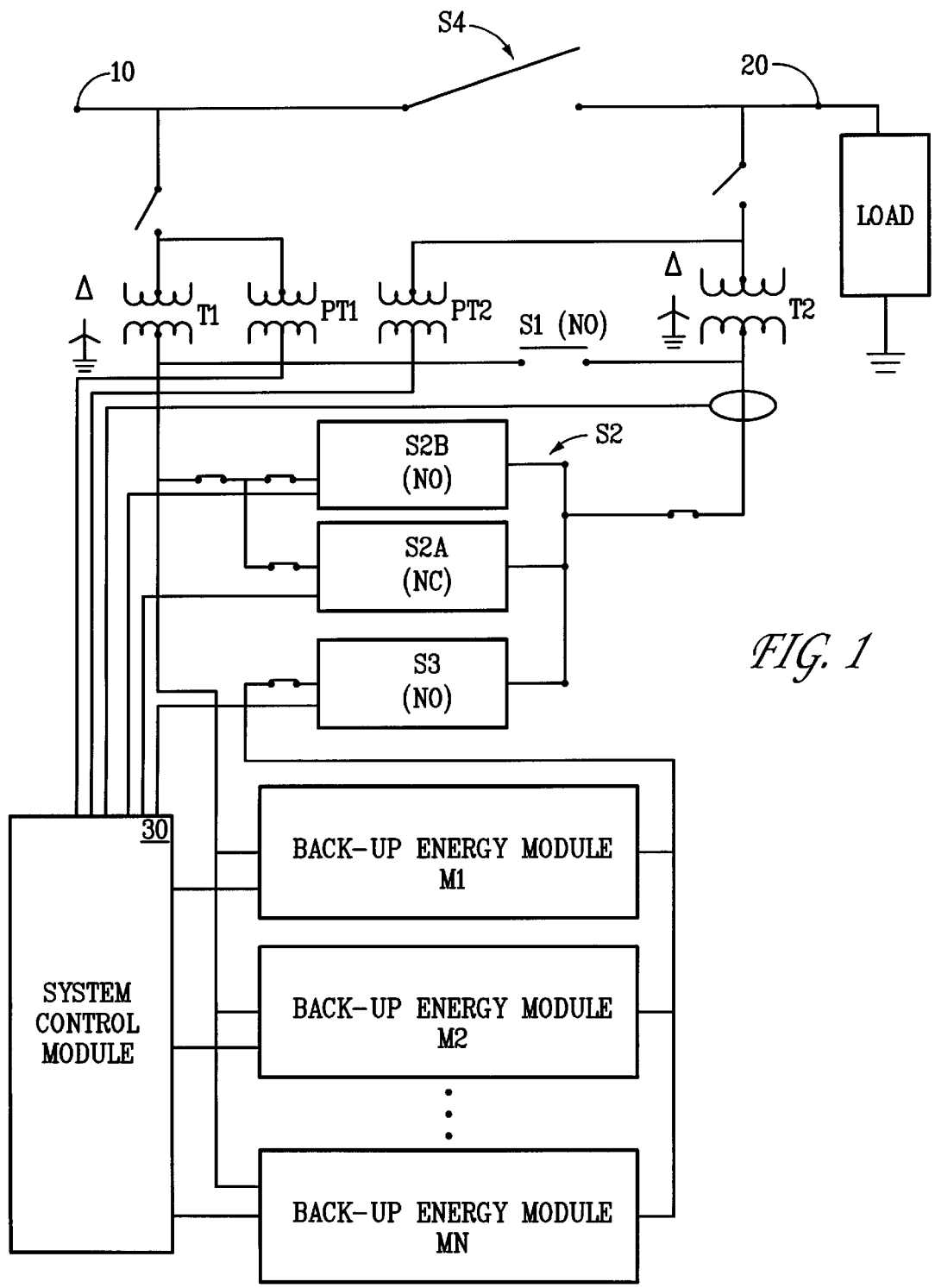

SYSTEM FOR MITIGATING VOLTAGE DISTURBANCES AND INTERRUPTIONS FOR POWER DISTRIBUTION APPLICATIONS

FIELD OF THE INVENTION

The present invention relates generally to the field of power distribution, and more particularly to systems for mitigating voltage disturbances and interruptions.

BACKGROUND OF THE INVENTION

Power outages and voltage disturbances can cause extensive damage to industrial processes and data loss in information systems. Momentary disturbances (e.g., disturbances with a duration of less than 5 seconds) account for the large majority of interruptions or voltage sags experienced on utility feeders.

Solutions for providing sag or interruption mitigation on utility feeders have been proposed. For example, it has been proposed to protect an entire utility feeder with a system in which an inverter and power electronics continuously supply power to the critical load to be protected. These solutions entail high costs, and several of them only provide sag mitigation as opposed to sag and interruption mitigation. They are therefore unable to prevent critical load outages in which the utility feeder opens, or in which sags occur coincident with a large phase angle offset as is normally the case for voltage disturbances resulting from transmission line faults.

Accordingly, a goal of the present invention is to provide a cost-effective solution for reliably mitigating voltage disturbances and interruptions.

SUMMARY OF THE INVENTION

The present invention provides a low cost solution that takes advantage of the brevity of the phenomenon (i.e., voltage interruption, outage, sag or disturbance) it is required to mitigate. The invention makes use of several unique properties of power semiconductor devices working together to accomplish the mitigation task in an optimum and cost effective way. The invention also reduces the continuous power loss inherent in systems that continuously process the full load power via power conversion/inversion processes. The inventive approach saves energy as compared to other approaches by not continuously processing the full load power but instead inserting full load power conversion in the system only during the brief voltage disturbance interval. The power processing inverters are run continuously but in a no load, low loss condition, thus improving the reliability of the entire system.

A system in accordance with the present invention mitigates disturbances and interruptions in unregulated, disturbance-prone electrical input power for energizing a load coupled to an output terminal. The system comprises at least one back-up energy module comprising a DC energy source coupled to a charging circuit and a DC-AC inverter. The system also comprises a first electronically controllable switch for conducting current from an input terminal to the load, a second electronically controllable switch for conducting current from the back-up energy module to the load, and a system control module. The control module controls the operation of the first and second switches and the back-up energy module so that current may be delivered from the input terminal to the load during normal operations and from the back-up energy module to the load during an occurrence of an interruption or disturbance of a short duration in the unregulated input power.

Other features of the present invention are described below.

BRIEF DESCRIPTION OF THE DRAWING(S)

FIG. 1 schematically depicts a presently preferred embodiment of a system for mitigating voltage interruption and disturbance phenomena in accordance with the present invention.

Figure 2A:
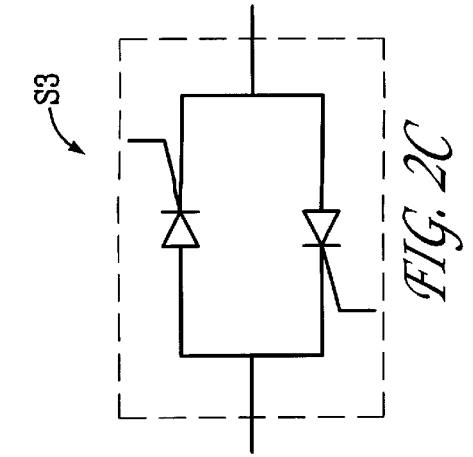

FIG. 2A schematically depicts a preferred embodiment of switch S2A of the system of FIG. 1.

Figure 2B:
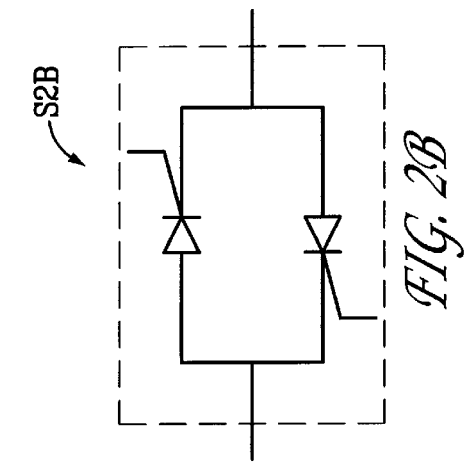

FIG. 2B schematically depicts a preferred embodiment of switch S2B of the system of FIG. 1.

Figure 2C:
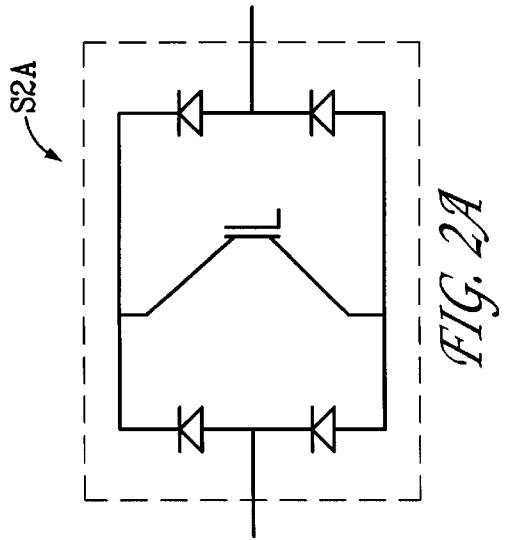

FIG. 2C schematically depicts a preferred embodiment of switch S3 of the system of FIG. 1.

Figure 2D:
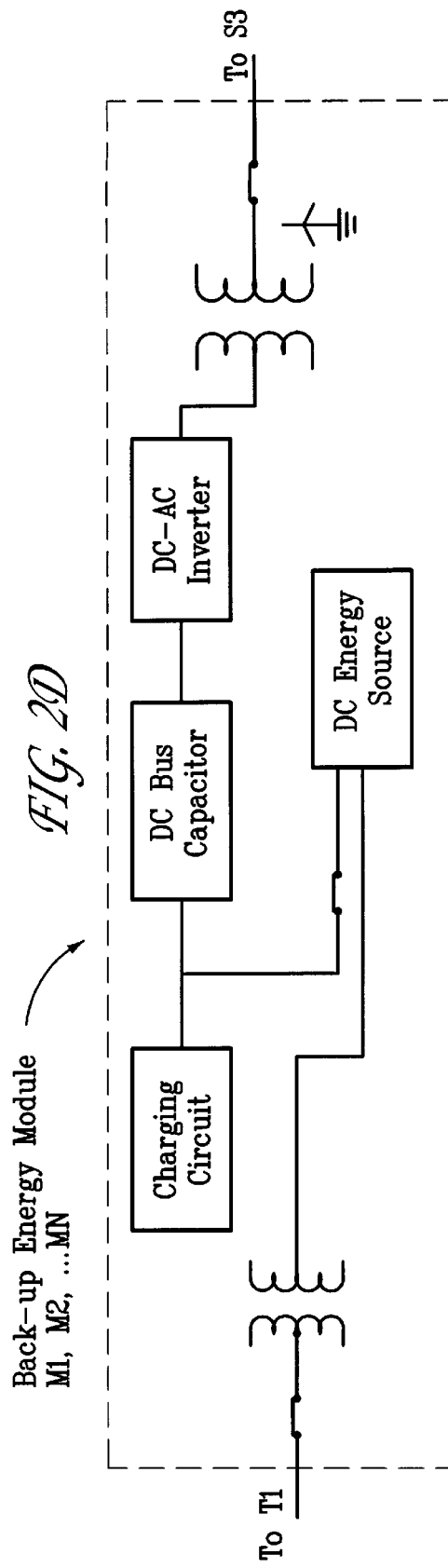

FIG. 2D schematically depicts a preferred embodiment of the back-up energy modules M1 through MN of the system of FIG. 1.

Figure 2E:
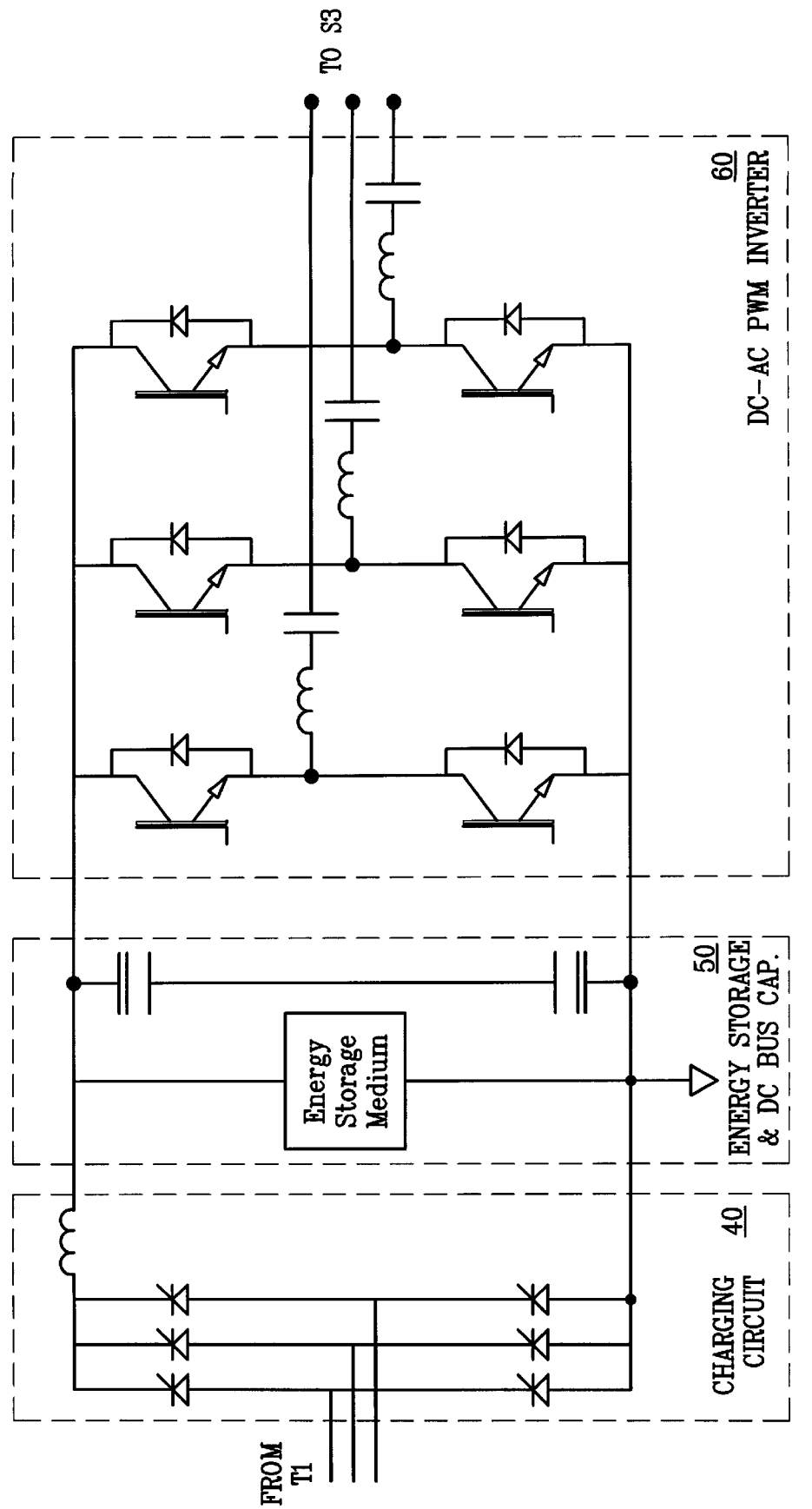

FIG. 2E schematically depicts an exemplary pulse width modulation (PWM) inverter circuit for use in the back-up energy modules M1 through MN.

DETAILED DESCRIPTION OF PREFERRED EMBODIMENTS

Referring to FIGS. 1 and 2A through 2D, the present invention may be embodied in an electronic circuit including an input terminal 10 at which unregulated, disturbance-prone utility power (voltage and current) is received. A regulated, disturbance-free (or substantially disturbance-free) output is provided at output terminal 20 to which a load may be connected. The circuitry between the input and output terminals 10 and 20 includes a system control module 30; back-up energy modules M1 through MN; switching devices S1, S2, S3 and S4; and transformers T1, T2, PT1, PT2, etc., as shown. In the preferred embodiment, each of the energy modules M1 through MN includes a charging circuit, DC bus capacitor, DC to AC inverter, energy source and transformers, as shown.

Switching device S4 is preferably implemented as a fast vacuum circuit breaker. During normal system operation, in the event of a down-stream fault, the fault current is initially supplied via the normally closed switch S2A for a few microseconds before the fault current is diverted into switch S2B by a very fast opening of switch S2A and simultaneous closing of switch S2B. A close command is simultaneously given to the fast acting (3 to 5 cycles) vacuum breaker S4. Switch S2B is economically designed only to carry the fault current for a few supply cycles. As soon as the vacuum breaker S4 closes, the fault current is diverted away from S2B via the vacuum breaker. This scheme offers the benefit of combining the fast switching property of switches S2A and S2B and the high current handling duty of the vacuum circuit breaker S4 to achieve downstream handling in the most economic and seamless way. In summary, deployment of a fast breaker (vacuum breaker for medium voltage applications) between the input and the output terminals 10 and 20 permits a retrofit application of the proposed schemes with existing load side fault and protection schemes.

During normal operation (no voltage disturbance), power flows from the input 10 through transformer T1, semiconductor switch S2A and transformer T2 to output terminal 20, at which the load is connected. During the input voltage disturbance, the load power is not derived through transformer Ti but is instead derived from DC sources (via parallel backup energy modules M1, M2, . . . MN) and through switch S3 and transformer T2. The switch S2 (S2A and S2B) is comprised of a combination of thyristors and gate commutable (switchable from the gate control lead on these devices) devices, such as Insulated Gate Bipolar Transistors (IGBTs), Gate Turn Off thyristors (GTOs), Insulated Gate Commutated Thyristors (IGCTs) or forced commutated Silicon Controlled Rectifiers (SCRs).

During normal operation, power flows through static switch S2A. In some systems, the need for switch S2A can be eliminated by use of a forced commutation scheme for the thyristors in switch S2B. If forced commutation for switch S2B is used, then the functions of switches S2A and S2B can be combined in switch S2B, thus resulting in more reduction in steady state power loss and cost.

Inverters in the backup modules (M1 through MN) are kept continuously operating in a state of readiness and in phase synchronism and frequency lock with the utility supply. As soon as (preferably within 1 to 2 milliseconds) an input voltage variation outside of a preset limit is detected by the control and supervisory module 30, switch S3 is commanded to start conduction and simultaneously gate commutatable switch S2A is commanded to stop conduction. The load is now supplied power by the inverter and energy storage systems of modules M1 through MN for a few cycles of the utility voltage disturbance or interruption. The output voltage and phase angle is maintained uninterrupted with about 2 to 4 milliseconds of total response time from the instant of disturbed utility supply to the restoration of clean supply to the load from the internal energy sources of modules M1 through MN. The short burst of energy that is needed is supplied by a high energy discharge source such as a high discharge battery, flywheel, capacitor bank, super capacitor or super conducting magnetic energy storage device, or batteries. When the utility source returns to within a specified preset voltage tolerance, a simultaneous command is given by the control module 30 for switch S2A to conduct and switch S3 to stop conduction. This restores operation back to normal mode.

If a fault occurs on the critical load side (point 20) at any time, the rate of increase of the current is detected by the control module 30 and a simultaneous command is issued to switch S2B and electromechanical switch S1 (connected between point 10 and 20) to conduct the fault current. Switch S2B is preferably implemented as a vary fast thyristor device that can carry the load side fault current for several power supply cycles during which switch S1 is closed to carry the fault current. This fault handling scheme permits delivery of the required fault current to the load side of the system to clear any down-stream branch protection devices such as circuit breakers and the like while maximizing the use of silicon devices. The ability to carry high fault currents allows downstream breakers to open (commonly a key system requirement) during a fault.

The inverters in modules M1 through MN can be of any configuration that has a very fast transient response. The principle of operation for such inverters can be any number of PWM methods. A schematic diagram of such a scheme is presented in FIG. 2E. The exemplary circuit of FIG. 2E includes a charging circuit 40, an energy storage/DC bus capacitor circuit 50, and a DC to AC inverter circuit 60. A small portion of total rated power is drawn by the charging (controlled rectifier) circuit 40 and fed into the energy storage medium, which may comprise batteries or a flywheel system to keep the energy storage medium and the DC bus capacitors fully charged in readiness to deliver energy to the PWM inverter section 60. During the input voltage disturbance, the main source of energy is either the batteries or the flywheels. A nominal small value of DC bus capacitor is employed to enhance the transient energy delivery response to the PWM inverter 60. The PWM inverter 60 is comprised of six switches that are rapidly switched (approximately at 30,000 to 40,000 Hz) with a 60 Hz sine weighted pulse width modulation. The three-phase PWM voltages generated at the output of the diode-transistor inverter section are filtered via the low pass LC filters to extract the 60 Hz ac output power to feed into switch S3. The control and supervisory module 30 keeps the phase and frequency of the 60 Hz inverter output in complete synchronization with the output voltage sensed via PT2 (FIG. 1). The inverters are always in the ON and synchronized state ready to assume load; however, static switch S3 is normally OFF so as to keep the inverters in a fully ready, no-load state to minimize losses in the power electronics. Since the duration of the disturbances and interruptions is typically short, the inverters are used up to their maximum thermal and electrical capability. The size of the inverter modules is thus reduced substantially to achieve significant cost reduction.

The energy storage devices also need only be sized for the short duration of the voltage interruptions/disturbances. Further, as mentioned above, the energy storage devices can include capacitor banks, supercapacitors, low-speed flywheels, batteries, or any other storage media (or any combination thereof).

Since power normally flows through static switch S2A producing only a small power loss (compared to power constantly flowing via the switching inverter and higher rated input rectifier modules), the disturbance mitigator of the present invention has a high operating efficiency. The low losses reduce cooling needs, which further reduces the cost and improves the reliability of the system.

The use of transformers T1 and T2 allows the electronics modules M1 through MN to operate at optimal (most economic) voltage/power ratings even when the load voltages are much in excess of the highest available power semiconductor device ratings. Load voltage ratings in the range of 4000 to 36000 V can be easily achieved without fundamentally changing the basic designs of the back-up energy modules M1 to MN. The use of transformers T1 and T2 also makes the system easily scalable and field-expandable from load systems of a few tens of kVA to thousands of kVA.

In sum, the presently preferred embodiment of the invention provides a low cost voltage disturbance mitigation system that is capable of providing continuous power to a load despite short interruptions or sag disturbances (of any depth) of the utility power. The interruption and sag mitigation system makes use of a combination of unique thermal and electrical properties of magnetic components, power semiconductor devices, and high-discharge-rate energy storage devices. It also facilitates a modular solution that can be easily and economically scaled up or down for use over a wide range of voltage and power levels, e.g., 480 V to 36 kV and 500 kVA to 10000 kVA.

Advantages of the present invention include the following:

1) Fast response time (within 2 to 3 milliseconds) with low power loss in continuous normal operation.
2) Up to 200% higher utilization of the silicon power electronics and magnetic components in the inverter modules. All Silicon power devices, such as IGBTs, GTOs, IGCTs or forced commutated SCRs, dissipate heat when conducting current to process the power flow. When in continuous use, the allowable maximum junction temperature (approximately 125 deg. C) determines the maximum power flow a given device can handle in normal mode. If the semiconductors in the inverter continuously process the power, then they continuously operate much below the allowable maximum junction temperature. This is normally done to allow for a design safety margin for continuous operation. This normally results about only 50% utilization of semiconductor ratings. All semiconductor devices have a short but finite thermal time constant that is required to raise junction temperature from ambient to maximum due to heat dissipation under power handling conditions. In the disclosed invention, by not passing the output power continuously through the inverter power semiconductors, their junction temperature is kept at a much lower level and as soon as an input voltage disturbance is detected, the inverter semiconductors begin processing the full power for a short disturbance interval of a few seconds. This method allows for a larger available rise in the junction temperature of the semiconductors, thus permitting utilization of semiconductors at nearly 100% power handling capacity for a short interval. This represents a factor of 2 or 200% increase over conventional use of continuous duty inverters.

3) Suitable for universal application regardless of the system voltage rating and class of the application requirement.

4) Combination of several power electronics devices for most optimum use in disturbance mitigation.

5) Mitigation against any magnitude of phase angle disturbance.

The above description of presently preferred embodiments of the invention is not intended to imply that other embodiments or applications of the invention are not within the scope of protection of the following claims. Those skilled in the art of power transmission and distribution will recognize that alternative embodiments and applications within the true spirit of the invention are possible.

What is claimed is:

1. A system for mitigating disturbances and interruptions in unregulated, disturbance-prone electrical input power for energizing a load coupled to an output terminal, comprising:
   (a) a plurality of back-up energy modules, each back-up energy module comprising a DC energy source operatively coupled to a charging circuit and a DC-AC inverter;
   (b) a first electronically controllable switch for conducting current from an input terminal to the load coupled to the output terminal;
   (c) a second electronically controllable switch operatively coupled to the back-up energy module for conducting current from the back-up energy module to the load; and
   (d) a system control module operatively coupled to the first and second switches and to the back-up energy module, wherein the system control module controls the operation of the first and second switches and the back-up energy module, whereby current is deliverable from the input terminal to the load during normal operations and from the back-up energy module to the load during an occurrence of an interruption or disturbance of a short duration in the unregulated input power;
   wherein the first electronically controllable switch comprises a normally open switching device and a normally closed switching device (S2A) coupled in parallel to the normally open switching device.

2. A system as recited in claim 1, wherein the DC energy source comprises at least one battery.

3. A system as recited in claim 1, wherein the DC energy source comprises at least one DC bus capacitor.

4. A system as recited in claim 3, wherein the DC energy source comprises a flywheel energy storage system.

5. A system as recited in claim 1, wherein the charging circuit comprises a rectifier circuit.

6. A system as recited in claim 1, wherein the DC-AC inverter comprises a pulse width modulation (PWM) inverter circuit.

7. A system as recited in claim 1, wherein the first electronically controllable switch comprises a combination of gate commutable devices.

8. A system as recited in claim 7, wherein the gate commutatable devices are selected from a group consisting of Insulated Gate Bipolar Transistors (IGBTs), Gate Turn Off thyristors (GTOs), Insulated Gate Commutated Thyristors (IGCTs) and forced commutated Silicon Controlled Rectifiers (SCRs).

9. A system as recited in claim 1, further comprising a vacuum circuit breaker operatively coupled between the input and outputs terminals.

10. A system as recited in claim 1, wherein the short duration is less than 5 seconds.

11. A system for mitigating disturbances and interruptions in unregulated, disturbance-prone electrical input power for energizing a load coupled to an output terminal, comprising:
    (a) a back-up energy module comprising a DC energy source operatively coupled to a charging circuit and a DC-AC inverter;
    (b) a first electronically controllable switch for conducting current from an input terminal to the load coupled to the output terminal;
    (c) a second electronically controllable switch operatively coupled to the back-up energy modules for conducting current from the back-up energy module to the load; and
    (d) a system control module operatively coupled to the first and second switches and to the back-up energy modules, wherein the system control module controls the operation of the first and second switches and the back-up energy modules, whereby current is deliverable from the input terminal to the load during normal operations and from the back-up energy modules to the load during an occurrence of an interruption or disturbance of a short duration in the unregulated input power;
    wherein the first electronically controllable switch comprises a normally open switch device and a normally closed switching device coupled in parallel to the normally open switching device.

12. A system for mitigating disturbances and interruptions in unregulated, disturbance-prone electrical input power for energizing a load coupled to an output terminal, comprising:
    (a) a back-up energy module comprising a DC energy source operatively coupled to a charging circuit and a DC-AC inverter;
    (b) a first electronically controllable switch for conducting current from an input terminal to the load coupled to the output terminal;
    (c) a second electronically controllable switch operatively coupled to the back-up energy module for conducting current from the back-up energy module to the load;

(d) a system control module operatively coupled to the first and second switches and to the back-up energy module, wherein the system control module controls the operation of the first and second switches and the back-up energy module, whereby current is deliverable from the input terminal to the load during normal operations and from the back-up energy module to the load during an occurrence of an interruption or disturbance of a short duration in the unregulated input power; and a first transformer coupling the first switch to the input terminal.

13. A system as recited in claim 12, further comprising a second transformer coupling the first switch to the output terminal.

14. A system for mitigating disturbances and interruptions in unregulated, disturbance-prone electrical input power for energizing a load coupled to an output terminal, comprising:

(a) a back-up energy module comprising a DC energy source operatively coupled to a charging circuit and a DC-AC inverter;

(b) a first electronically controllable switch for conducting current from an input terminal to the load coupled to the output terminal;

(c) a second electronically controllable switch operatively coupled to the back-up energy module for conducting current from the back-up energy module to the load; and (d) a system control module operatively coupled to the first and second switches and to the back-up energy module, wherein the system control module controls the operation of the first and second switches and the back-up energy module, whereby current is deliverable from the input terminal to the load during normal operations and from the back-up energy module to the load during an occurrence of an interruption or disturbance of a short duration in the unregulated input power;

wherein: the DC energy source comprises at least one DC bus capacitor; the charging circuit comprises a rectifier circuit; the DC-AC inverter comprises a pulse width modulation (PWM) inverter circuit; the first electronically controllable switch comprises a combination of gate commutable devices, including a normally open switching device and a normally closed switching device coupled in parallel to the normally open switching device; and further comprising a vacuum circuit breaker operatively coupled between the input and output terminals, a first transformer coupling the first switch to the input terminal and a second transformer coupling the first switch to the output terminal.

15. A system as recited in claim 14, wherein the short duration is less than 5 seconds.

* * * * *

UNITED STATES PATENT AND TRADEMARK OFFICE
CERTIFICATE OF CORRECTION

PATENT NO. : 6,175,166 B1
DATED : January 16, 2001
INVENTOR(S) : Vinod N. Bapat

It is certified that error appears in the above-identified patent and that said Letters Patent is hereby corrected as shown below:

Column 5, claim 1,
Lines 55, 60, 62, and 64, the word "module" should be pluralized to read -- modules --

Column 6, claim 1,
Lines 1-4, should be deleted and replaced with the following:

-- wherein the back-up energy modules are configurable to permit a wide range of load voltage ratings without fundamentally changing the basic designs of the back-up energy modules.--

Column 6, claims 11,
Line 53, "open switch" should read -- open switching --.

Signed and Sealed this

Thirtieth Day of October, 2001

Attest:

NICHOLAS P. GODICI
Attesting Officer   Acting Director of the United States Patent and Trademark Office